United States Patent [19]

Foldbjerg

[11] Patent Number: 4,461,626
[45] Date of Patent: Jul. 24, 1984

[54] HAND PRESSING DEVICE FOR MAKING FUEL BRIQUETTES FROM SOAKED PAPER

[76] Inventor: Erik Foldbjerg, Stendyssevej 84, DK-3540 Lynge, Denmark

[21] Appl. No.: 341,129

[22] Filed: Jan. 20, 1982

[30] Foreign Application Priority Data

Feb. 23, 1981 [DK] Denmark ................................. 799/81

[51] Int. Cl.³ ........................ B30B 11/00; C10L 11/08
[52] U.S. Cl. ........................................ 44/11; 100/116; 100/240; 100/293
[58] Field of Search ................................ 44/2, 11–13, 44/14, 15 D; 100/116, 125, 240, 280, 293

[56] References Cited

U.S. PATENT DOCUMENTS

| | | | |
|---|---|---|---|
| 818,796 | 4/1906 | Spengler | 100/125 X |
| 1,195,370 | 8/1916 | Larsen | 100/116 |
| 1,473,874 | 11/1923 | Risk | 44/14 |
| 2,133,667 | 10/1938 | Mitchell | 100/293 X |
| 2,492,878 | 12/1949 | Miollis | 100/280 X |
| 3,070,485 | 12/1962 | Strickman | 44/13 X |

FOREIGN PATENT DOCUMENTS

| | | |
|---|---|---|
| 4791622 | 2/1916 | France . |
| 39911 | 3/1915 | Sweden ................ 100/116 |

Primary Examiner—Carl F. Dees
Attorney, Agent, or Firm—Watson, Cole, Grindle & Watson

[57] ABSTRACT

A hand pressing device includes a pressing die in the form of an open-topped rectangular box having a loose perforated bottom plate. The inner walls of the box are smooth. The box is filled with soaked waste paper, particularly old newspapers and a loose pressing plunger with a flat perforated bottom is pressed into the box down to a predetermined penetration depth, whereby water is squeezed out of the soaked paper and escapes both upwards through the perforated bottom of the plunger and downwards through the perforated bottom plate of the box to form a briquette of predetermined dimensions and predetermined density. Upon withdrawal and removal of the pressing plunger and inversion of the box to an upside down position, the briquette thus produced can readily be pressed out of the box by exerting thumb pressure on the loose bottom plate. The side and end faces of the briquette slide along the inner wall of the box with low friction and without being torn. After drying in air, the briquette forms an excellent fuel for fireplaces and stoves.

9 Claims, 2 Drawing Figures

HAND PRESSING DEVICE FOR MAKING FUEL BRIQUETTES FROM SOAKED PAPER

BACKGROUND OF THE INVENTION

1. Field of the Invention

This invention relates to a hand pressing device for making fuel briquettes from soaked paper.

2. Description of the Prior Art

An example of a known related pressing device is disclosed in French patent specification No. 479,162.

SUMMARY OF THE INVENTION

It is the object of the invention to provide a do-it-yourself device by means of which waste paper, particularly old newspapers heaping up in the household, can be formed into valuable fuel briquettes of uniform quality and uniform shape, permitting regular stacking, in a simple and speedy process that can be correctly performed by any person upon the first try.

The device includes a rectangular box with an open top, with smooth inner walls, and with a loose, perforated bottom plate. The box serves as a pressing die. A pressing plunger is adapted to be placed in the box and fitted therein with a loose sliding fit. The plunger has a flat perforated bottom. A high ratio hand lever arrangement for pressing the plunger into the box to a predetermined penetration depth is also provided.

In using the device according to the invention, the box is placed on a support and is filled with a pulpy mass of soaked paper up to its upper edge. Thereafter the pressing plunger is placed on top of the paper mass and is pressed down to the predetermined depth by means of the lever arrangement. Thereby the paper mass is compressed to a briquette of predetermined configuration and density, such that a high proportion of the water content is pressed out during this compression. Since the water can escape both upwards through the perforated bottom of the plunger and downwards through the perforated bottom plate of the box, the pressing step can be performed easily and rapidly, and the residual water is distributed uniformly and symmetrically in the briquette. Upon completion of the pressing step the box is tilted to pour out the water that has collected above the perforated bottom of the plunger. Upon return of the lever arrangement to its starting position and removal of the plunger, the briquette can be smoothly pressed out of the box by exerting a moderate pressure on the loose perforated bottom plate of the box, because the side and end faces of the briquette can slide along the smooth inner walls of the box at low friction and without being torn. The briquettes made in this manner have a uniform block shape and are practically crumble-free, so that they can be stacked in a regular formation. After having been dried in the air they form an excellent fuel, that burns quietly and steadily in a fireplace or stove. Test results have shown a combustion heat value approximately equal to that of brown coal briquettes and an ash content of approximately 2%.

The hand lever arrangement may advantageously include two hand levers mounted at opposite ends of the box. The levers are adapted to be swung from a spread-out position longitudinally across the top of the box, past one another then down towards the box, and to co-operate with shoulders on the plunger to press the plunger into the box to a predetermined depth. By this arrangement the user of the device is enabled to exert his body pressure with both hands symmetrically above the pressure area, while in all other steps of the process the hand levers will be positioned in their spread-out position and will therefore not be in the way.

In a particularly practical embodiment the hand levers are formed as U-shaped members pivotably secured to the box at the ends of their legs and so differing in length and width that in swinging these U-shaped members across the top of the box, one lever can be passed through the other to permit both levers to be shifted over from hand to hand.

In a preferred constructional form, the plunger is a channel-shaped structure having a perforated bottom and two side members, the latter being connected with each other adjacent the ends of their top edges by reinforcing pins extending beyond the side members to form the shoulders for the engagement of the lever arrangement and at the same time to form stops for engagement with the top edge of the box to define the depth to which the plunger can be pressed into the box. The pins, besides acting as reinforcement and forming stops, are also useful in facilitating the withdrawal of the plunger after completion of the pressing step.

BRIEF DESCRIPTION OF THE DRAWING

Various other objects, features and attendant advantages of the present invention will be more fully appreciated as the same becomes better understood from the following detailed description when considered in connection with the accompanying drawings, in which like reference characters designate like or corresponding parts through the several views and wherein.

DETAILED DESCRIPTION OF THE PREFERRED EMBODIMENT

Figure 1:
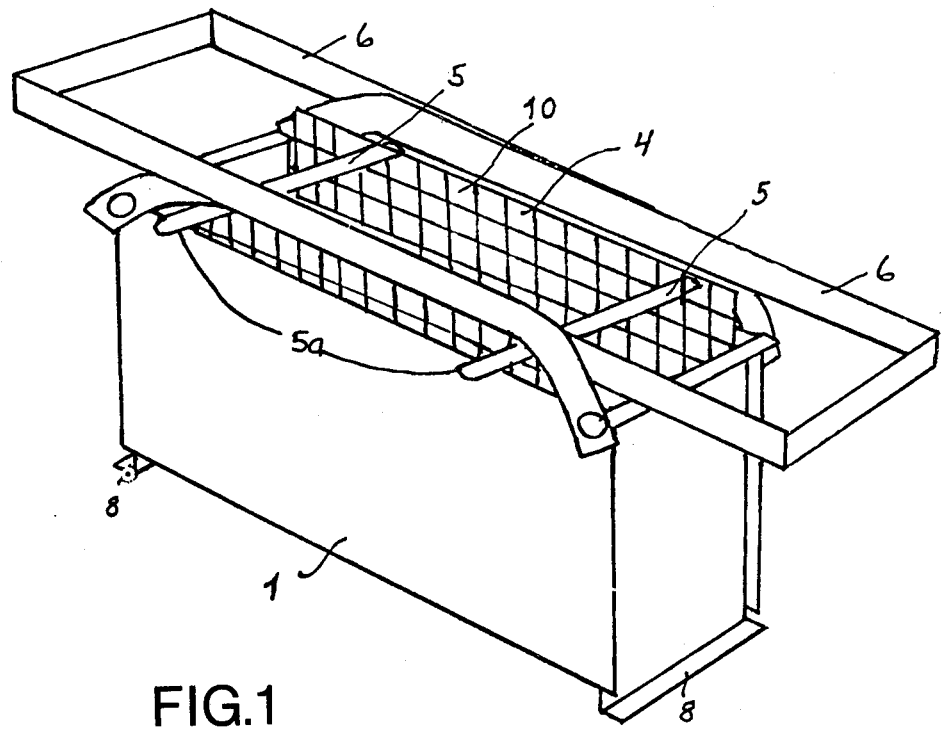
FIG. 1 is a perspective view of a hand pressing device according to one embodiment of the invention.
Figure 2:
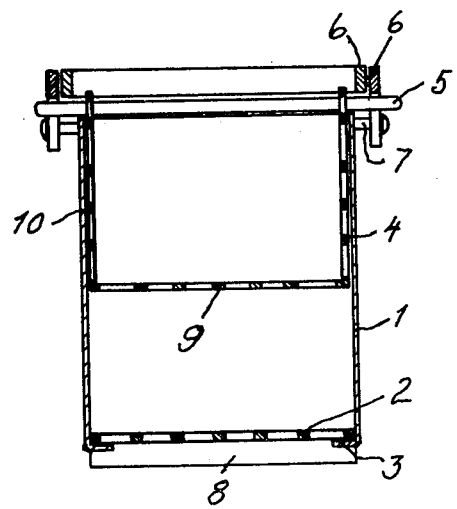
FIG. 2 is a vertical cross section through the embodiment of FIG. 1.

In the FIGS. 1 and 2, the device is shown in its packed-up state which it assumes when not in use, and at the end of the pressing step.

A pressing die 1 in the form of an open-topped box is made from sheet metal and has non-perforated, smooth walls. However, only the smoothness of the inner walls is essential. The bottom of the box includes a loose perforated bottom plate 2 which is supported on bent-up ledges 3 along the longitudinal bottom edges. By means of feet 8 at the ends of the box the bottom plate 2 is slightly raised from the surface on which the box is supported so that pressed-out water can freely escape.

Two U-shaped members serving as hand levers 6 are pivotably mounted at opposite ends of the box 1 adjacent the upper edges of the side walls of the box by means of transverse pins 7. In the packed-up storage state of the device, the hand levers 6 lie horizontally along the top of the box. The U-levers have different widths so that the legs of one can lie between the legs of the other. They also have different lengths so that in swinging the U-levers one can be passed through the other. Each time this takes place, whether in one direction or the other, the levers can readily be changed from hand to hand.

A loose pressing plunger 4 is inserted into the box 1 from the top. In the embodiment shown, the pressing plunger is made from perforated metal sheet bent into a channel-shape, and thus has a flat perforated bottom 9 and two side members 10 projecting upwards from the sides of the bottom. This constructional form of the pressing plunger has been chosen for purely practical reasons, but only the perforated bottom is essential. The perforations of the side members in this embodiment have no function.

The pressing plunger 4 fits in the box 1 with a loose sliding fit. The upper edges of the side members, 10 are connected with each other near the ends of the plunger by transverse pins 5 which extend laterally beyond the side members 10 to form shoulders 5a. In the packed-up state of the device these shoulder pins 5a rest on the upper edges of the box, so that the pressing plunger depends loosely into the box.

The described device is used for carrying out the following process. In a storage vessel a batch of waste paper, particularly old newspapers, is immersed into water, sheet by sheet, and is left to stand therein until the paper has become completely soaked and has been more or less disintegrated, whereby the paper assumes a pulpy consistency, which can be improved and promoted by stirring from time to time.

The pressing device is now placed on a support, such as a table or floor from which the water can drain away, the U-levers 6 are spread out completely and released so that their ends drop down onto the support, and the pressing plunger 4 is withdrawn from the box 1 and set aside. From the storage vessel the soaked paper mass is then scooped into the box 1 with the hands or with a perforated scoop, until the box is full up to—or practically up to—its upper edge, care being taken to distribute the paper mass uniformly in the box. The pressing plunger 4 is now placed on top of the paper mass, and the U-levers 6 are swung lengthwise across the box, changed from hand to hand when passing each other, and are finally pressed down towards the box, whereby the U-levers engage the shoulder pins, thereby pressing the plunger 4 into the box 1 at a favourable leverage ratio, until the shoulder pins 5a engage the upper edge of the box 1, to set the predetermined depth of penetration.

Now the device is tilted to pour out the water that has collected above the perforated bottom 9 of the plunger 4, and after the U-levers 6 have been spread out completely, and the plunger 4 has been withdrawn, the box 1 is inverted. By exerting a moderate pressure on the loose bottom plate 2, e.g. with the thumbs, and at the same time lifting the box 1, the briquette made by the pressing operation can be pressed out of the box 1 smoothly and without suffering any distortion or damage.

It has been found that in the soaking of the paper mass a state of saturation will be reached, and that excess water can readily be poured or drained off, or will otherwise trickle off when the paper mass is transferred from the storage vessel to the box. Consequently, the soaked paper mass will always have the same consistency at the beginning of the pressing operation. It has therefore been possible to fix an optimum ratio of compression. Based on this recognition, the depth of penetration of the plunger into the box can advantageously be so selected that the ratio of compression amounts to about 2:1 to 2.5:1. At lower compression the coherence of the briquette will be unsatisfactory, and at higher compression the required physical exertion will rise too high when it is desired to make briquettes of a size practical for domestic use, e.g. $24\times 9\times 5$ cm, in a rapid and practical operation. The leverage ratio may be approximately 7:1, and the total pressure at the end of the pressing stroke may be approximately 350 kgs.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus for forming fuel briquettes from soaked paper, comprising:
    a rectangular frame member having rigidly interconnected non-perforated side walls and end walls with smooth inner faces;
    a perforated plate disposed within said frame member;
    supporting means for supporting said perforated plate provided on said frame member;
    a pressing plunger dimensioned to slide within said frame member, said plunger having a perforated bottom portion and an open top portion;
    bearing means provided on said plunger;
    a first manually operated lever and a second manually operated lever each pivotably mounted on said frame member and each adapted to pivot from a first position wherein said levers extend outwardly away from said frame member to a second position wherein said levers extend over said frame member and wherein pivotal movement of said levers from said first position to said second position effects contact between said levers and said bearing means so as to press said plunger into said frame member.

2. The apparatus of claim 1 wherein said perforated plate is removably disposed within said frame member with a loose fit for facilitating removal of said fuel briquettes from said apparatus.

3. The apparatus of claim 1 wherein said bearing means comprises a plurality of pins projecting outwardly from said plunger.

4. The apparatus of claim 3 wherein said plurality of pins extend transversely across said plunger for reinforcing said plunger.

5. The apparatus of claim 1 wherein said supporting means comprises a plurality of inwardly projecting ledge members.

6. The apparatus of claim 1 wherein said plunger comprises a substantially U-shaped transverse cross section.

7. The apparatus of claim 1 wherein said bearing means is adapted to engage said frame member for setting a depth to which said plunger can be pressed into said frame member.

8. The apparatus of claim 1 wherein said first and second levers each comprise substantially U-shaped levers differing in length and width so as to allow said first lever to pivot beneath and through said second lever.

9. The apparatus of claim 1 wherein said perforated bottom portion of said plunger comprises a flat surface portion.

* * * * *